(12) United States Patent
Thompson

(10) Patent No.: US 7,275,647 B1
(45) Date of Patent: Oct. 2, 2007

(54) SPICE RACK

(76) Inventor: Alan S. Thompson, 28735 530th Ave., Kelley, IA (US) 50134

( * ) Notice: Subject to any disclaimer, the term of this patent is extended or adjusted under 35 U.S.C. 154(b) by 202 days.

(21) Appl. No.: 10/995,924

(22) Filed: Nov. 23, 2004

(51) Int. Cl.
*A47G 29/00* (2006.01)

(52) U.S. Cl. .................................................. 211/85.18

(58) Field of Classification Search ............ 211/85.18, 211/74, 85.4, 58, 75, 78, 95, 163, 16
See application file for complete search history.

(56) References Cited

U.S. PATENT DOCUMENTS

| 150,718 | A | * | 5/1874 | Seavey | 211/77 |
| 170,288 | A | * | 11/1875 | Miller | 312/280 |
| 954,143 | A | * | 4/1910 | Schultz | 211/16 |
| 1,759,140 | A | * | 5/1930 | Silberger | 211/77 |
| 2,114,735 | A | * | 4/1938 | Crilly | 248/121 |
| 2,694,495 | A | | 11/1954 | Faures | |
| 2,911,107 | A | * | 11/1959 | Francavillo | 211/78 |
| 4,438,853 | A | | 3/1984 | Numbers | |
| 4,643,104 | A | | 2/1987 | Rasmussen | |
| 4,895,260 | A | * | 1/1990 | Ancona et al. | 211/77 |
| 5,083,670 | A | * | 1/1992 | Zimmer | 211/95 |
| 5,183,165 | A | * | 2/1993 | Acona et al. | 211/77 |
| 5,641,080 | A | | 6/1997 | Humphrey | |
| 6,062,398 | A | * | 5/2000 | Thalmayr | 211/74 |
| 6,505,747 | B1 | * | 1/2003 | Robertson | 211/74 |
| 6,585,119 | B2 | | 7/2003 | Palder | |
| D490,273 | S | | 5/2004 | Hockey | |
| 6,755,310 | B1 | * | 6/2004 | Hilton et al. | 211/59.2 |
| 6,905,034 | B2 | * | 6/2005 | Jones | 211/85.18 |

* cited by examiner

*Primary Examiner*—Sarah Purol
(74) *Attorney, Agent, or Firm*—McKee, Voorhees & Sease, P.L.C.

(57) ABSTRACT

The spice rack of the present invention comprises a rotatable carriage having elongated tracks with opposite ends for frictionally engaging the sidewalls of spice containers so as to grip and hold the containers in the tracks. A plurality of containers can be received in each track. The carriage includes a central tube which is adapted to be rotatably mounted upon a spindle or upon the arms of a paper towel rack. The spindle is supported at opposite ends by boards or plates. In one embodiment, a back wall extends between the end boards so that the carriage can be mounted on a wall in a horizontal or vertical orientation, or be hung beneath a kitchen wall cabinet.

21 Claims, 2 Drawing Sheets

SPICE RACK

BACKGROUND OF THE INVENTION

Spice racks having various designs have been known for many years. Typically, conventional carousel style spice racks have a carriage which is rotatably mounted upon a spindle or upon a turntable for easy display of the spice containers. Conventional spice racks include a floor or support surface to engage the bottom of the spice containers. Fingers or sleeves may be spaced above the spice rack floor so as to preclude the containers from moving relative to the floor. Only one spice container is normally retained by each set of fingers or sleeves. Thus, conventional spice racks do not hold very many spice containers.

Accordingly a primary objective of the present invention is the provision of a spice rack adapted to hold numerous spice containers.

A further objective of the present invention is the provision of a spice rack having a rotatable carriage which can hold up to 24 spice containers.

Another objective of the present invention is the provision of a spice rack which can be mounted on a wall in a vertical or horizontal orientation.

Still another objective of the present invention is the provision of a spice rack which can be hung from beneath a kitchen cabinet.

Yet another objective of the present invention is the provision of a spice rack which frictionally grips the sidewalls of the spice container, without supporting the bottom of the container.

Another objective of the present invention is the provision of a spice rack having a carriage formed with multiple elongated tracks, with each track being adapted to hold a plurality of spice containers.

Still another objective of the present invention is the provision of a spice rack having a carriage which is adapted to be supported by the arms of a paper towel rack.

Another objective of the present invention is the provision of a spice rack which holds the plastic spice bottles and jars of the major spice manufacturers, as purchased at supermarkets and grocery stores.

A further objective of the present invention is the provision of a spice rack which is economical to manufacture and durable in use.

These and other objectives will become apparent from the following description of the invention.

SUMMARY OF THE INVENTION

The spice rack of the present invention generally includes a rotatable carriage having elongated tracks for frictionally engaging and gripping the sidewalls of spice containers, so as to hold the containers in the tracks without supporting the containers from below. The tracks extend slightly beyond 180° such that the spice containers are snap fit into the tracks. In one embodiment, the carriage is rotatably mounted upon a spindle supported at opposite ends by end walls. In yet another embodiment, a plate extends between the end walls to permit the rack to be mounted to a wall in a vertical or horizontal orientation. In another embodiment, the carriage is supported by the arms of a paper towel rack mounted beneath a kitchen cabinet.

DETAILED DESCRIPTION OF THE PREFERRED EMBODIMENT

Figure 1:
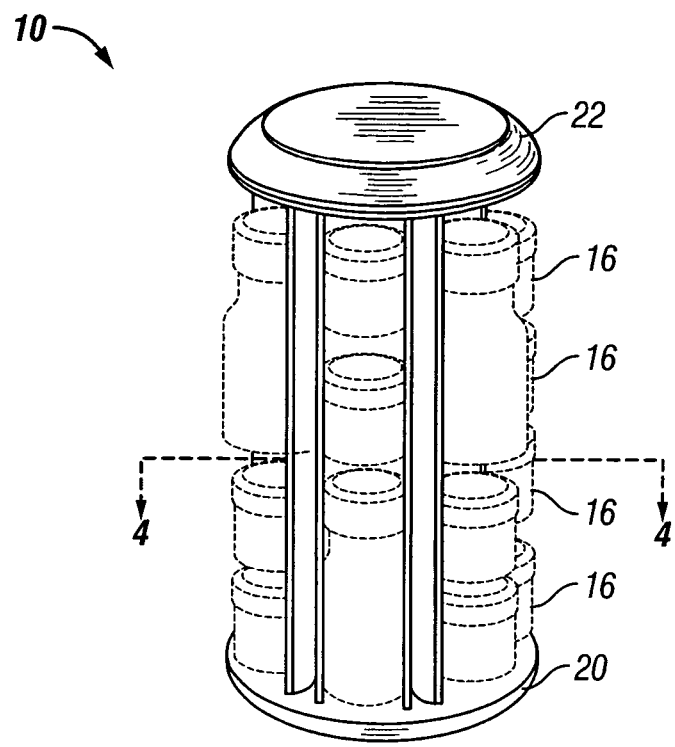
FIG. 1 is a perspective view of a first embodiment of the spice rack of the present invention.

The spice rack of the present invention generally includes a rotatable carriage 10 with a plurality of elongated tracks 12. The tracks are secured to a central tube 14. Each track 12 extends slightly beyond 180° so as to be substantially semi-cylindrical in shape. Each track 12 is adapted to hold a plurality of spice containers 16. The spice containers 16 are snap fit into the tracks 12, with the tracks 12 frictionally engaging and gripping the sidewall of the containers 16. No support on the bottom of the containers 16 is necessary.

The spice rack carriage 10 can be supported in several ways. In a first embodiment shown in FIGS. 1 and 4, the carriage 10 is mounted upon a spindle 18. The spindle 18 has opposite ends which are supported by a base board or plate 20 and a head board or plate 22. The base board 20 and head board 22 define the opposite ends of the spice rack. The carriage 10 extends substantially between the base and head boards 20, 22. The base board 20 allows the carriage to be set upright upon a counter or table.

Figure 2:
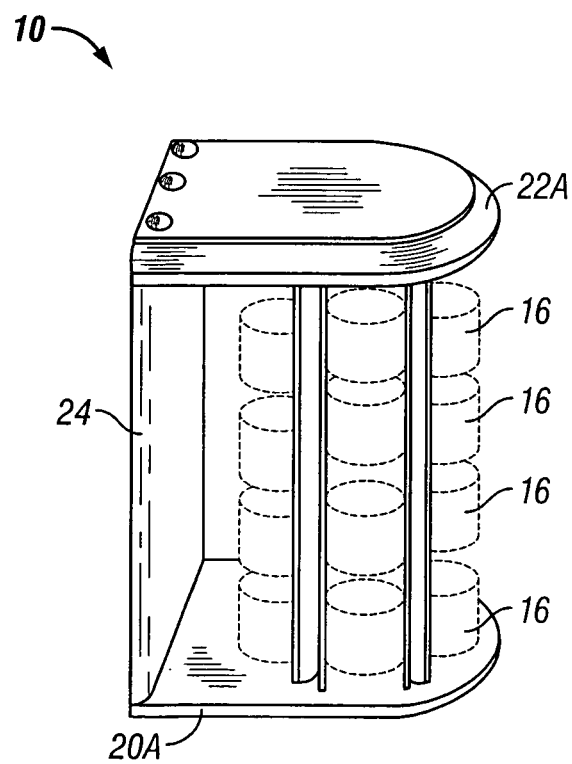
FIG. 2 is a perspective view of a second embodiment of the spice rack of the present invention.

A second embodiment of the spice rack is shown in FIG. 2. In the second embodiment a spindle (not shown) extends between the base board 20A and the head board 22A, with the carriage 10 rotatably mounted on the spindle between the boards 20A, 22A. A back board or plate 24 extends between the base board 20A and head board 22A. The base board 20A will support the carriage 10 in an upright orientation upon a countertop or table, similar to the first embodiment. Alternatively, the backboard 24 can be mounted on a wall such that the carriage 10 is oriented in either a vertical or a horizontal orientation. As a further alternative, the back board 10 can be mounted beneath a kitchen wall cabinet, such that the carriage 10 hangs beneath the cabinet in a horizontal orientation for convenient access by a user.

Figure 3:
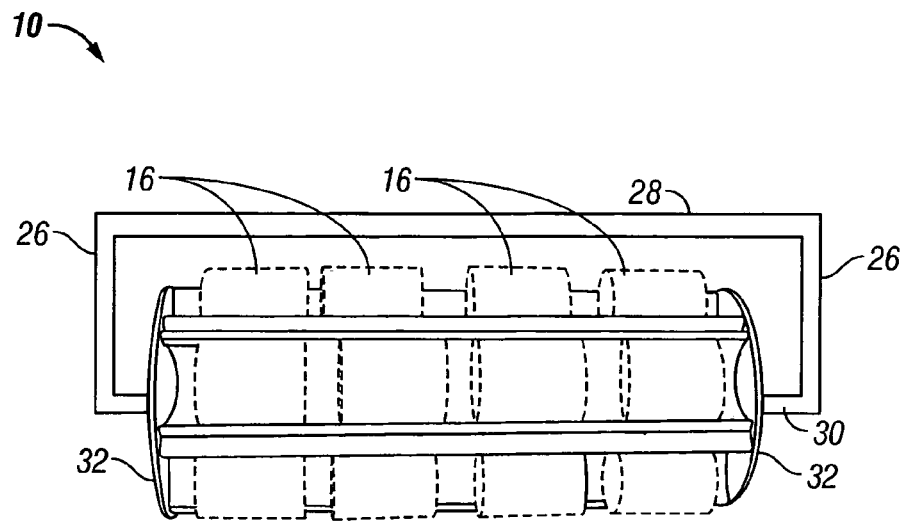
FIG. 3 is a front elevation view of a third embodiment of the spice rack of the present invention.

A third embodiment of the spice rack is shown in FIG. 3. In the third embodiment, the carriage 10 is adapted to mount onto the arms 26 of a conventional paper towel rack mounted beneath a kitchen wall cabinet. The hollow ends of the tube 14 are sized for receipt of the inner projections 30 on the arms 26. The carriage 10 is thus rotatably supported by the paper towel rack 28 for convenient use. In this third embodiment, the tube 14 includes end walls 32 to which the tracks 12 are attached in any convenient manner so as to provide rigidity to the carriage 10.

Figure 4:
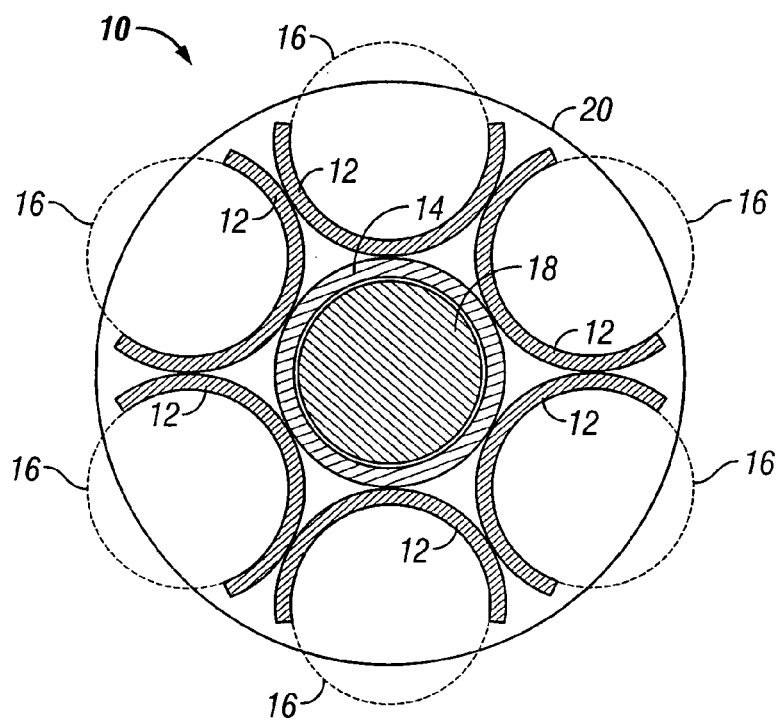
FIG. 4 is a sectional view of the spice rack taken along lines 4-4 of FIG. 1.

Preferably, the tracks 12 are made of a resilient or flexible plastic material, so that the opposite sides of each track 12 will easily receive and hold the spice containers 16. As best seen in FIG. 4, the carriage 10 includes six tracks 12. Each track 12 can hold at least 4 standard-sized spice bottles or containers, such that the spice rack of the present invention will hold at least 24 spice containers 16 in the carriage 10. Rotation of the carriage 10 allows the user to quickly and easily find a specific desired spice container 16. Preferably, the spice containers 16 are spaced apart slightly within each track 12 so a user can grab a container 16 with their finger and thumb on the top and bottom of the container 16.

From the foregoing, it can be seen that the spice rack of the present invention, in all three embodiments, is a spaced-saving device which conveniently displays the spice containers 16 for quick and easy selection by a user.

The invention has been shown and described above with the preferred embodiments, and it is understood that many modifications, substitutions, and additions may be made which are within the intended spirit and scope of the invention. For example, the rack can be used to hold other jars and containers holding small objects, such as nuts, bolts, washers, nails, crews, and arts and crafts beads and supplies. The rack can also hold spools of threat. From the foregoing, it can be seen that the present invention accomplishes at least all of its stated objectives.

The invention claimed is:

1. A spice rack, comprising:
   first and second opposite ends;
   a spindle extending between the opposite ends;
   a tube rotatably mounted on the spindle;
   a plurality of elongated tracks secured to the tube, with each track extending substantially between the opposite ends; and
   each track being adapted to frictionally grip a plurality of spice containers;
   each track having a substantially semi-cylindrically-shaped vertical wall, free from horizontal shelves, with opposite resilient sides for snap fit receipt of multiple spice containers.

2. The spice rack of claim 1 wherein the spindle has a longitudinal axis, and each track has a longitudinal axis, with the axes of the spindle and tracks being parallel.

3. The spice rack of claim 1 further comprising a plate extending between the opposite ends for mounting the rack to a kitchen wall in a horizontal or vertical orientation.

4. The spice rack of claim 1 further comprising a plate extending between the opposite ends for hanging the rack from beneath a kitchen wall cabinet.

5. In combination with a paper towel rack mounted beneath a kitchen wall cabinet and having a pair of downwardly extending arms, a spice rack comprising:
   a cylindrical tube with opposite ends adapted to be rotatably supported by the arms of the paper towel rack;
   a plurality of elongated tracks secured to the tube and extending between the tube ends, with each track adapted to grip a plurality of spice containers; and
   each track having a smooth, unobstructed curved wall with opposite resilient edges to retain multiple spice containers in the track.

6. The spice rack of claim 5 further comprising a cap on each end of the tube and the tracks being secured to the caps.

7. The spice rack of claim 5 wherein each track has a substantially semi-cylindrical shape for snap fit receipt of the spice containers.

8. The spice rack of claim 5 wherein the tracks extends approximately 180° to engage a sidewall of the spice containers.

9. A rack comprising:
   a rotatable carriage having elongated tracks with opposite sides for frictionally engaging sidewalls of containers or objects so as to hold the containers or objects in the tracks, without supporting the containers or objects from below; and
   the tracks gripping the containers with sufficient force so as to preclude the containers from dropping by gravity within the tracks.

10. The rack of claim 9 wherein the carriage has an axis of rotation and the tracks extend parallel to the axis.

11. The rack of claim 9 further comprising a spindle upon which the carriage is mounted for rotation.

12. The rack of claim 11 further comprising opposite end walls for supporting the spindle.

13. The rack of claim 12 further comprising a plate extending between the end walls for mounting the rack to a support surface.

14. The rack of claim 13 wherein the support surface is a wall and the carriage is mountable vertically or horizontally.

15. The rack of claim 13 wherein the support surface is horizontal, and the carriage is hung from the horizontal support surface.

16. The rack of claim 9 wherein each track has a substantially semi-cylindrical shape for snap fit receipt of the spice containers.

17. The rack of claim 9 wherein the tracks extends approximately 180° to engage a sidewall of the spice containers.

18. The rack of claim 9 wherein the tracks are sized so as to hold spice jars.

19. The spice rack of claim 2 wherein the tracks grip the containers with sufficient force so as to preclude the containers from dropping by gravity within the tracks.

20. The spice rack of claim 1 wherein each track defines a single compartment for receiving multiple containers.

21. The rack of claim 9 wherein each track has an unobstructed vertical wall along which multiple spice containers can be placed.

* * * * *